United States Patent Office 3,109,743
Patented Nov. 5, 1963

3,109,743
RAPID ACETYLATION OF CELLULOSE
CRYSTALLITE AGGREGATES
Edwin G. Fleck, Jr., Wallingford, and Orlando A. Battista, Drexel Hill, Pa., assignors, by mesne assignments, to FMC Corporation, San Jose, Calif., a corporation of Delaware
No Drawing. Filed Mar. 13, 1962, Ser. No. 179,477
9 Claims. (Cl. 106—183)

This invention relates to a method of making the triacetate of cellulose crystallite aggregates, particularly solutions thereof suitable for use in the production of fibers, films, tubes, and the like.

Cellulose triacetate solutions have been made heretofore by reacting cellulose with acetic anhydride in the presence of sulfuric acid as a catalyst and acetic acid as a solvent for the cellulose triacetate that is formed. The resulting triacetate has then been subjected to hydrolysis to remove sulfate groups which, undesirably, are formed in the cellulose, the hydrolysis being carried out in the presence of added water which not only aids the removal of the sulfate groups but also converts any unreacted acetic anhydride to acetic acid. If necessary, precipitating agents are used to precipitate the sulfuric acid.

This application is a continuation-in-part of copending application Ser. No. 83,376, filed January 18, 1961, which discloses the acetylation of cellulose crystallite aggregates to produce the triacetate thereof, using an acetylating mixture comprising acetic anhydride and acetic acid, and sulfuric acid as a catalyst. There is recovered a reaction mixture comprising a spinnable solution of cellulose crystallite aggregates triacetate dissolved in acetic acid.

According to the present invention, the cellulose crystallite aggregates are reacted with acetic anhydride in the present of very small amounts of sulfuric acid catalyst and in the absence of acetic acid. The liquid-to-solid ratio of the reaction mixture is therefore quite low. By holding down the sulfuric acid concentration, it is possible to obtain a solution of the triacetate in which the sulfur concentration is low enough to be ignored, thus making it unnecessary to hydrolyze sulfate groups off the triacetate or to precipitate the sulfuric acid. The absence of acetic acid during the reaction means that the reaction mixture will have a lower volume or mass than heretofore, and in turn the reaction temperature may range higher and the reaction itself may proceed faster. In many cases, in view of the swiftness of completion of the reaction, external cooling need not be used. And as the reaction is exothermic, external heat need not be applied. Not only is the reaction performed in the absence of acetic acid, and the sulfuric acid content severely limited, but also water is substantially excluded from the reaction mixture, and in the result, such mixture, being of sharply reduced volume, is easier to filter and has a considerably increased triacetate content. Economies are afforded by omitting the acetic acid and most of the sulfuric acid.

The invention in summary comprises the method of acetylating cellulose crystallite aggregates at a low liquid-to-solid ratio and in the absence of any addition of acetic acid per se. Substantially anhydrous conditions are employed. The reaction mixture is formed by mixing the aggregates with acetic anhydride to form a stirrable slurry, then adding a very small amount of sulfuric acid as a catalyst. As the exothermic reaction proceeds, the temperature is permitted to rise to a peak valve, which it does in less than half an hour, at which point the reaction is completed, and the resulting reaction mixture, comprising a spinnable solution of the triacetate of the cellulose crystallite aggregates, is recovered.

Cellulose crystallite aggregates, together with their properties and the manner of obtaining them, are described at length in the said copending application, Ser. No. 83,376, filed January 18, 1961. For convenience, some features of such description are given here, it being understood that the said application may be consulted for a more complete description.

The cellulose crystallite aggregates are acid-insoluble products obtained from the controlled acid hydrolysis of cellulose, and comprise a crystalline residue or remainder which is recovered, being referred to as cellulose crystallite aggregates. Preparation of the aggregates is also described in Patent Number 2,978,446. Briefly, although hydrolysis may be effected by various specific methods including the use of various acids, a direct method which is free of secondary reactions comprises the treatment of the original cellulosic material with 2.5 normal hydrochloric acid solution for 15 minutes at boiling temperature. Another method comprises a treatment with a 0.5% aqueous hydrochloric acid solution for 1 hour at 250° F. It may be observed that "crystallite," as used herein, is a cluster of longitudinally disposed, closely packed cellulose chains or molecules, and that "aggregates" are clusters of crystallites.

The aggregates suitable for use in the invention have a preferred average level-off D.P. of 125 to 375 anhydroglucose units. Preferred sources for making such material include cotton linters and wood pulp having a high alpha-cellulose content. Other suitable aggregates may have lower average level-off D.P. values, say in the range of 60 to 125, or even 15 to 60. Crystallite aggregates in the 60 to 125 D.P. range are obtainable from the acid hydrolysis of alkali-swollen natural forms of cellulose, suitably a cellulose that has been mercerized by treatment with 18% caustic soda solution at 20° C. for two hours. Aggregates in the 15 to 60 D.P. range are prepared from regenerated forms of cellulose, including tire and textile yarns, other regenerated cellulose fibers, and cellophane.

In every case the cellulosic source material has a D.P. greater than the level-off D.P. thereof.

If desired, the aggregates may be mechanically disintegrated as by subjecting them, preferably in the presence of an aqueous medium, to attrition in a mill, or to a high speed cutting action, or to the action of high pressures on the order of at least 5,000 or 10,000 p.s.i. Whatever method is used the disintegration is extensive enough so that the resulting distintegrated aggregates are characterized by forming a stable suspension in the aqueous medium in which they are being attrited or in which they may be subsequently dispersed. By a stable suspension is meant one from which the aggregates will not settle out but will remain suspended indefinitely. At lower concentrations of aggregates the suspension is a dispersion, while at higher concentrations it is a gel. It is thought that stable suspensions result from the presence therein of at least 1% by weight of aggregates having a particle size of up to one micron.

Either before or after mechanical disintegration, the aggregates may be dried, which may be done in a suitable vacuum, or in air at room temperature or higher, going up preferably to 60° C. to 80° C., although the temperature may extend up to 100 or 105° C. A preferred procedure is to displace the water in the wet aggregates, preferably by means of a low boiling, water-miscible, polar organic compound, and then to evaporate off the compound; the resulting dried aggregates, it is found, tend to be more reactive than otherwise. Spray drying in air or under slightly reduced pressure is also satisfactory, as is drum drying, and also freeze drying. Freeze drying in particular favors the development of a very porous material which is characterized by the presence in the aggregates of a multiplicity of pores or depressions of extremely small size and which is quite reactive.

If desired, the aggregates may be fractionated to obtain fractions of more uniform particle sizes, including fractions having a particle size of up to 1, 2, 5, 10, 40, 50, 100, etc. microns; also fractions of 10 to 100 microns, or 50 to 100 microns, 50 to 200 microns, 100 to 200 microns, etc.

The use of the aggregates as the cellulosic material provides worthwhile advantages, particularly in respect of their purity, particulate form, and low D.P. Uniform and reproducible triacetate product in high yields are the direct results of the high purity of the aggregates. The particulate form of the aggregates enables low liquid-to-solid ratios to be used in the reaction while at the same time providing stirrable liquid slurries. Even the theoretical minimum liquid-to-solid ratio of 1.89:1 may be used, this ratio defining the stoichiometrical amounts of the acetic anhydride and the aggregates that may be reacted. Of interest in this connection is the fact that conventional fibrous cellulose as derived from wood pulp will not form a liquid slurry at a liquid-to-solid ratio of 1.89:1; the cellulose is so bulky and so difficult to wet that, upon mixing with the acetic anhydride, it simply forms a dry-looking porous, fluffy mass. Much higher liquid-to-solid ratios are required to form the conventional cellulose into a liquid slurry. In respect of their low D.P. the aggregates give triacetate products which have better solution properties and lower viscosities than products from conventional cellulose.

As indicated, the manner of washing and/or drying the aggregates may affect their reactivity in the acetylation reaction. For example, quite reactive aggregates comprises material which, following recovery from the hydrolysis and water washing steps, is subjected in the never-dried state to two successive washing steps with glacial acetic acid, after which, preferably without drying, it is acetylated. Other reactive forms of the crystallite aggregates may be made by washing with a low molecular weight alcohol, acid, or ketone, including methanol, ethanol, propanol, isopropanol, propionic acid, butyric acid, acetone, dioxane, methyl ethyl ketone, and the like. Some forms are made by freeze drying, spray drying, or drum drying the water washed, never dried aggregates. Following is a list of preferred reactive forms of aggregates comprising an identification of the washing and/or drying treatment, the reactivity, and the bulk density. In each case the starting material subjected to the described treatment was the never-dried product of the hydrolysis and water washing steps, this product having been formed by hydrolysis of cellulose wood pulp (Ketchikan wood pulp containing 93% alpha-cellulose) with 0.5% HCl solution at 250° F. for one hour and then washed with water until free of HCl.

TABLE 1

| No. | Treatment | Reactivity, ° C./min. | Bulk density, lbs./cu. ft. |
|---|---|---|---|
| 1 | Two acetic acid washes, never dried | 38 | |
| 2 | Freeze dried | 17.3 | 9.8 |
| 3 | Two acetic acid washes, air dried | 12.5 | 12.1 |
| 4 | Isopropanol washed, air dried | 9.3–12.5 | 11.2–11.5 |
| 5 | Methanol washed, air dried | 9.2 | 14 |
| 6 | Isopropanol washed, attrited in isopropanol at 15% solids, and air dried | 9.1–9.2 | 22 |
| 7 | Drum dried | 7.7 | 11.5 |
| 8 | Spray dried | 7.4 | 14.9 |
| 9 | Spray dried, fines | 6.0 | 19.5 |
| 10 | Never dried | 3.3 | |

The acetylating reactivity of each specimen was determined by taking each form of aggregates, after the treatment noted in the second column of the table, and adding to it a standard acetylating mixture comprising 30 g. of aggregates, 168 g. of acetic acid, 78 g. of acetic anhydride, and 3 g. of sulfuric acid. On a parts by weight basis this mixture comprised 1 part of aggregates, 5.6 parts of acetic acid, 2.6 parts of acetic anhydride, and 0.1 part of sulfuric acid. The initial temperature in degrees centigrade of the reaction mixture was noted, as was the maximum temperature reached by the mixture and the time in minutes required to reach such maximum. The reactivity was calculated by subtracting the initial temperature from the maximum and then dividing by the time required to reach the maximum. Thus, a reactivity of 38° C. per minute, as shown by sample No. 1 of the table, means that the temperature of the reaction mixture, on the average, rose 38 centigrade degrees during each minute that the reaction was allowed to continue. It may be noted that sample No. 10 is the water-washed product of the acid hydrolysis step, designated above as the "as-formed" product. On the basis of the table, preferred materials for the acetylation reaction are, in order, Nos. 1 through 10, preferably Nos. 1 through 6, 7, 8, or 9. The expression "acetylating reactivity" which may appear in the claims is to be understood as that defined in this paragraph.

Bulk density was determined by measuring the weight of 100 cc. of the dry powder produced as the result of each treatment noted in the table. The lower the bulk density value, the fluffier is the product, and conversely, the higher the bulk density the heavier the product.

The crystallite aggregates are acetylated by forming a reaction mixture comprising mixing 1.89 to 3 parts of acetic anhydride with one part of aggregates, all parts by weight, to form a stirrable liquid slurry. Higher amounts of acetic anhydride may be used, going up to 4 or 5 parts, but 3 parts are preferred. After mixing, concentrated sulfuric acid is added in the lowest practical amount, usually in the range of 0.004 to 0.007 part, preferably 0.004 to 0.005 part, per part of aggregates. No acetic acid or water is added to the mixture. If one ignores the very small amount of water present in the sulphuric acid, and the small amount in the aggregates (2 to 5% by weight of the aggregates), the reaction mixture may be said to be substantially anhydrous. As the reaction proceeds, however, the acetic anhydride is used up, serving to acetylate the aggregates and forming acetic acid; and this acetic acid acts as a solvent for the triacetate product. The temperature of the reaction is permitted to rise to its peak value, which may be in the range of 40 to 100° C., and preferably is 50 to 90° C. and more preferably 60 to 85° C. The rise in temperature takes place quickly, requiring no more than 30 minutes and usually 10 to 15 or 20 minutes. After reaching a peak, the temperature drops quickly; it is considered that the reaction is complete after the peak temperature is reached. During the reaction, no external heat is applied to the reaction mixture, and preferably no external cooling is used other than natural cooling in air. After completion of the reaction, the mixture may be filtered, and the filtered mixture is recovered; it comprises a substantially water-free solution of the triacetate of the cellulose crystallite aggregates and is in a form suitable for spinning. If desired, glacial acetic acid may be added to it to obtain more dilute solutions.

It will be seen that the liquid-to-solid ratio of the mixture of reactants is low. Ignoring the sulfuric acid and the moisture content of the aggregates, it is the ratio of the acetic anhydride to the cellulose crystallite aggregates and varies from 1.89:1 to 5:1.

Although it is preferred to mix the aggregates and the acetic anhydride before adding the catalyst, it is possible to mix the anhydride and catalyst and then add the mixture to the aggregates.

In some cases it may be desirable to take the hot triacetate solution and spin it. If any unreacted acetic anhydride is present, it will be hydrolyzed when the spun product enters the coagulating bath comprising dilute acetic acid. Where spinning is not to be performed immediately, and where unreacted acetic anhydride is still present, the solution may be stored as is, or it may be desirable to add to it a sufficient amount of a hydrolyzing agent, such as dilute acetic acid or very small quantities of water, to hydrolyze the excess acetic anhydride and thus to effectively reduce its capacity to react further with the aggregates. Other suitable compounds for quickly stopping or killing the reaction are aqueous solutions of sodium acetate, sodium diacetate, potassium acetate, magnesium acetate, calcium acetate, aluminum acetate, and the like.

The amount of sulfuric acid catalyst that is used is limited so that the residual sulfur content of the triacetate solution can be ignored as being too small to affect spinning. Of course, if the residual sulfur is large enough to adversely affect spinning, then it should be taken into account, as by adding water or acetic acid to hydrolyze sulfate groups from the aggregates, or by adding a precipitant for the sulfate such as one of the foregoing killing agents.

While other useful catalysts may be employed, such as perchloric acid, zinc chloride, sulfuryl chloride, water soluble sulfate salts like sodium sulfate, sodium bisulfate, potassium sulfate, Lewis acids and the like, the preferred catalyst is sulfuric acid.

In regard to the triacetate solution, its viscosity may be in the range of 3,000 to 500,000 centipoises, preferably 10,000 to 100,000 and more preferably about 25,000 to 75,000 centipoises. In general, the viscosity should be greater than 3,000 to 5,000 cp. in order to produce a fiber. The viscosity is greater with higher concentrations of the triacetate. The triacetate concentration of the spinning solution may range from about 25 to 49%, and even up to the theoretical maximum of 61.5%, with the balance being acetic acid; in some cases the presence of some unreacted acetic anhydride can be tolerated. The D.P. of the triacetate in solution may be in the range of 90 to 240 or 250, preferably 100 to 170, anhydroglucose units, although it may range up to 375 anhydroglucose units. The acetyl value of the triacetate is 41 to 44.8%, usually 43 to 44%. The triacetate solution is a thick viscous straw-colored liquid. Examination of it under the microscope shows it to be free of unreacted particles of the aggregates.

The triacetate solution may be spun in conventional wet spinning equipment. Thus, it may be charged to a storage tank from which it may be continuously pumped through a heat exchanger and then through a candle filter to the spinning bath where it is forced through jets into a coagulating bath comprising aqueous acetic acid. It is preferred to maintain the coagulating bath at a lower temperature than the spinning solution to encourage rapid hardening of the fiber. It is considered that acetic acid quickly leaves the newly formed structure, thus precipitating the triacetate, whereas the acetic acid in the coagulating bath, being colder than that in the spinning solution, will not penetrate the newly formed structure readily. Upon leaving the spinning bath the fibers may pass over a first godet roll and then through a warm water bath where they are stretched, following which they may be washed over a second godet roll, dried and recovered. A second stretch may or may not be applied prior to drying.

The invention may be illustrated by the following examples.

*Example 1*

Cellulose crystallite aggregates were prepared by hydrolyzing Ketchikan sulfite wood pulp with 0.5% HCl for 60 minutes at 250° F. The aggregates were washed with water, then with isopropanol, and then dried in air. They had an average level-off D.P. of 220, and a moisture content of about 5% by weight. Thirty g. of the aggregates were added to a mixing vessel, followed by 78 g. of acetic anhydride, and the two components were mixed to form a stirrable slurry. Then 0.15 g. (4 drops) of concentrated sulfuric acid was added and mixing continued. In less than 10 minutes the temperature of the mix climbed to 80° C., where it remained; after a total reaction time of 15 minutes, the reaction was considered complete. Microscopic examination of the solution showed it to be free of aggregate particles and suitable for spinning or casting.

*Example 2*

Cellulose crystallite aggregates were prepared as in Example 1 except that they were not dried, the moisture content being about 64% by weight. The wet aggregates were washed with methanol, dried in air, and then, in an amount of 30 g., were mixed with 128.5 g. of acetic anhydride in a mixing vessel to form a stirrable slurry. Then 0.2 g. concentrated sulfuric acid (5 drops) was added and mixing continued. The temperature rose to 90° C. in 15 minutes, and the reaction was stopped by addition of 31 cc. of 60% acetic acid solution and 0.34 g. of sodium acetate. The Brookfield viscosity of the mixture was 3000 cp. (centipoises), as determined by a Brookfield Synchro-lectric viscometer, model RVT, at room temperature (25° C.). The solution was considered to be suitable for spinning. Microscopic examination revealed it to be free of particles of the aggregates. The solution was used to coat uncoated tea bag paper (made from hemp) on one side with coatings 0.003 and 0.006 inch in thickness, after which the paper was immersed in a bath containing a 20% aqueous solution of acetic acid to produce films of the triacetate on the sheets. The dried sheets had wet strength.

*Example 3*

In order to demonstrate their reactivity, the aggregates, prepared as in Example 1, in their never-dried state were washed with methanol and dried in air. Then 30 g. of the aggregates were mixed with 128.5 g. of acetic anhydride to form a stirrable slurry, 0.15 g. of sulfuric acid (4 drops) was added, and during the course of the ensuing reaction the temperature rose to 91° C. in 15 minutes.

Following the above procedure, the methanol-washed aggregates and acetic anhydride were reacted in the same amounts except that only 0.12 g. of concentrated sulfuric acid (3 drops) was employed. In this case the temperature rose to 86° C. in 24 minutes.

Another run was made in which the aggregates were not washed in any solvent other than water. The amounts of ingredients were: 30 g. of aggregates, 128.5 g. of acetic anhydride, and 0.12 g. of concentrated sulfuric acid (3 drops). In this case the temperature of the reaction rose to 35° C. in 5 minutes and then slowly rose to 36° C. over the next 33 minutes.

The expression "stirrable slurry" or "stirrable liquid slurry" refers to a slurry which is stirrable as a liquid or which flows as a liquid.

As is apparent from the foregoing experiments, while the aggregates are reactive in their water-washed state following their formation, the reactivity is considerably increased when their water content is displaced by the methanol. In this connection, another experiment was run in which it was sought to acetylate conventional cellulose as obtained from wood pulp, using the same quantities of acetic anhydride and sulfuric acid as described in the foregoing tests. It was found that the liquid components merely wetted the cellulose without forming a stirrable slurry.

Some of the advantages of the invention may be summarized. The use of the aggregates as the cellulosic source material brings to the method a particulate material of high purity, resulting in a triacetate product that is uniform and reproducible from batch to batch, obtainable in high yields, and which has good solution and viscosity properties. By using the more reactive forms of the aggregates, lower reaction temperatures are practical and, in turn, there is less chance of degrading the molecular chains of the aggregates; also, the reaction proceeds more rapidly, smoothly, and desirably, gives a less viscous triacetate product. The triacetate solution is clear and smooth, and free of gels; in many cases it may be spun or cast without the necessity of filtering it prior to introduction to the jets.

By restricting the amount of sulfuric acid catalyst, there is far less sulfation of the cellulosic material, and consequently a greatly reduced amount of the difficultly removable sulfate groups. In many cases the concentration of sulfate groups is low enough to be negligible, and spinning of the triacetate solution may be carried out without attempting to remove such groups from the triacetate. The absence of acetic acid from the reaction mixture means that the resulting triacetate solution, being less dilute, will have a higher solids content, and this in turn means a higher throughput. Thus, economies are available in terms of the increased throughput and the elimination of acetic acid.

In the reaction itself, only a simple mixing step is required. In view of the decreased volume of the reaction mixture, the temperature rise is greater and more rapid, and the reaction is completed more quickly. There is also less volume to be filtered, if a filtration step is used. No external heating is necessary, nor external cooling. Because of the fast reaction, there is less chance that the cellulosic material will deteriorate, and therefore in many cases cooling is not required. In many cases the reaction need not be stopped, as by the addition of water; instead, the reaction mixture comprising the triacetate solution may be sent directly to spinning or casting.

The invention is applicable to the production of other esters of the cellulose crystallite aggregates, preferably lower aliphatic acid esters such as the propionate, butyrate, acetate propionate, and acetate butyrate, in which the aggregates are substantially completely esterified. These esters are made in the manner described except that the acetylating agent is the appropriate aliphatic acid anhydride having 2 to 4 carbon atoms and including propionic anhydride and butyric anhydride as well as acetic anhydride. Appropriate mixtures of these anhydrides will produce the mixed esters noted.

Although the invention has been described in connection with specific embodiments of the same, it will be understood that it is capable of obvious variations without departing from its scope.

In the light of the foregoing description, the following is claimed.

1. The method of acetylating cellulose crystallite aggregates under substantially anhydrous conditions to produce the triacetate derivative thereof which comprises forming a reaction mixture by mixing, per part by weight of said aggregates in dry form, 1.89 to 3 parts of acetic anhydride to form a stirrable slurry, said aggregates having a level-off D.P., then adding 0.004 to 0.007 part of sulfuric acid as a catalyst, the liquid-to-solid ratio of the reaction mixture being 1.89/1 to 3/1, reacting said aggregates and anhydride in the absence of the addition of acetic acid per se and in the absence of externally applied heating and cooling, permitting the temperature of the reaction mixture to rise to a peak value thereof in the range of 60 to 80° C. over a period of 10 to 15 minutes, and recovering a substantially water-free spinnable solution of the triacetate of said cellulose crystallite aggregates in the form of said reaction mixture; said solution having a triacetate content of up to 61.5% by weight thereof, said triacetate having a D.P. of 90 to 240 anhydroglucose units, an acetyl content of 41 to 44.8%, and a sulfur content less than about 0.05% by weight, and said solution being free of unreacted particles of aggregates when examined under the microscope.

2. Method of claim 1 in which said aggregates are washed with a water-miscible oxygen-containing polar organic compound prior to acetylation.

3. Method of claim 2 in which said aggregates are washed with a low aliphatic alcohol prior to acetylation.

4. Method of claim 2 in which said aggregates are washed with a low aliphatic acid prior to acetylation.

5. The method of acetylating cellulose crystallite aggregates under substantially anhydrous conditions to produce the triacetate thereof which comprises forming a reaction mixture by mixing one part by weight of said aggregates with 1.89 to 5 parts of acetic anhydride to form a stirrable liquid slurry, then adding 0.004 to 0.007 part of sulfuric acid as a catalyst, the liquid-to-solid ratio of the reaction mixture being 1.89/1 to 5/1, reacting said aggregates and anhydride in the absence of the addition of acetic acid per se, permitting the temperature of the reaction mixture to rise to a peak value thereof over a period of 10 to 30 minutes, and recovering a spinnable solution of the triacetate of said cellulose crystallite aggregates in the form of the resulting reaction mixture.

6. The method of claim 5 wherein said aggregates are characterized by having an acetylating reactivity of at least 6° C. per minute, said acetylating reactivity being defined by the expression $$\frac{Tf - Ti}{t}$$

where $Ti$ is the initial temperature in degrees centigrade of a mixture of the aggregates and a standard acetylating reagent and $Tf$ is the temperature in degrees centigrade of said mixture after $t$ minutes.

7. The method of acetylating cellulose crystallite aggregates under substantially anhydrous conditions to produce the triacetate thereof which comprises forming a reaction mixture by mixing one part by weight of said aggregates with 1.89 to 5 parts of acetic anhydride and 0.004 to 0.007 part of sulfuric acid to form a stirrable liquid slurry, the liquid-to-solid ratio of the reaction mixture being 1.89/1 to 5/1, reacting said aggregates and anhydride in the absence of the addition of acetic acid per se, permitting the temperature of the reaction mixture to rise to a peak value over a period of 10 to 30 minutes, and recovering a spinnable solution of the triacetate of said cellulose crystallite aggregates in the form of the resulting reaction mixture, said solution being characterized by being substantially anhydrous and by having a negligible sulfur content.

8. The method of acetylating cellulose crystallite aggregates under substantially anhydrous conditions to produce the triacetate thereof which comprises forming a reaction mixture by mixing one part by weight of said aggregates with 1.89 to 5 parts of acetic anhydride and a catalyst to form a stirrable slurry, the liquid-to-solid ratio of the reaction mixture being 1.89/1 to 5/1, reacting said aggregates and anhydride in the absence of the addition of acetic acid per se, and recovering a spinnable solution of the triacetate of said cellulose crystallite aggregates in the form of the resulting reaction mixture.

9. The method of esterifying cellulose crystallite aggregates under substantially anhydrous conditions which comprises forming a reaction mixture by mixing, per part by weight of said aggregates 1.89 to 5 parts of a lower aliphatic acid anhydride having 2 to 4 carbons to form a stirrable slurry, then adding 0.004 to 0.007 part of sulfuric acid as a catalyst, the liquid-to-solid ratio of the reaction mixture being 1.89/1 to 5/1, reacting said aggregates and anhydride in the absence of the addition of acetic acid per se, permitting the temperature of the reaction mixture to rise to a peak value thereof over a period of up to 30 minutes, and recovering a spinnable solution of substantially completely esterified cellulose crystallite aggregates in the form of the resulting reaction mixture.

References Cited in the file of this patent

UNITED STATES PATENTS

| | | |
|---|---|---|
| 2,845,441 | Steinmann | Aug. 26, 1958 |
| 2,899,423 | Malm et al. | Aug. 11, 1959 |
| 2,978,446 | Battista et al. | Apr. 4, 1961 |
| 3,041,329 | Campbell et al. | June 26, 1962 |
| 3,047,561 | Crane | July 31, 1962 |

UNITED STATES PATENT OFFICE
CERTIFICATE OF CORRECTION

Patent No. 3,109,743            November 5, 1963

Edwin G. Fleck, Jr., et al.

It is hereby certified that error appears in the above numbered patent requiring correction and that the said Letters Patent should read as corrected below.

Column 10, line 7, for "2,845,441" read -- 2,849,441 --.

Signed and sealed this 21st day of April 1964.

(SEAL)
Attest:

ERNEST W. SWIDER

Attesting Officer

EDWARD J. BRENNER

Commissioner of Patents